United States Patent
Ogden, Sr. et al.

[15] 3,662,147
[45] May 9, 1972

[54] WELDING GUN TRIGGER CONTROL CIRCUIT

[72] Inventors: Ralph Ogden, Sr., Munster; Gerald E. Enoksen, Crown Point, both of Ind.

[73] Assignee: Ogden Engineering Corporation, by said Gerald E. Enoksen

[22] Filed: Mar. 26, 1970

[21] Appl. No.: 22,948

[52] U.S. Cl. .................................... 219/131 R, 219/130
[51] Int. Cl. ......................................................... B23k 9/10
[58] Field of Search ................. 219/131, 130, 135, 60, 74, 219/75

[56] References Cited

UNITED STATES PATENTS

| | | | |
|---|---|---|---|
| 2,510,207 | 6/1950 | Behnke et al. | 219/130 |
| 2,702,333 | 2/1955 | Anderson | 219/130 |
| 2,776,361 | 1/1957 | Essig | 219/130 X |
| 2,808,499 | 10/1957 | Anderson | 219/135 |
| 2,871,336 | 1/1959 | Lobosco et al. | 219/74 |
| 2,906,859 | 9/1959 | Steele | 219/130 |
| 2,922,023 | 1/1960 | Hackman et al. | 219/74 |
| 3,207,881 | 9/1965 | Pagan | 219/60 |
| 3,459,996 | 8/1969 | Adamson et al. | 219/135 X |

*Primary Examiner*—J. V. Truhe
*Assistant Examiner*—George A. Montanye
*Attorney*—Mann, Brown, McWilliams & Bradway

[57] ABSTRACT

A MIG welding gun trigger control circuit in which the welding gun trigger is employed to control the supply of welding gas, welding current, and welding wire feed to the gun, with the arrangement being such that to start the welding the operator presses the trigger to obtain a pre-welding gas purge without welding current or wire feed, and after the pre-welding gas purge is completed, the trigger is released to start the wire feed and provide welding current as well as continue the shielding gas flow. If the arc forms, the operator proceeds and completes the weld without having to hold the trigger switch closed, and when the weld is complete, the operator again presses the trigger switch to stop the wire feed but provide continued gas flow for post-welding purge, this action setting into motion a timer circuit that briefly continues welding current supply for stub burn off. After post-purge, release of the trigger switch shuts off the welding system and re-sets the system for the next welding operation. If the arc fails to form during the start cycle or if the arc or the weld current is broken during the actual weld, the control system automatically shuts itself off.

5 Claims, 3 Drawing Figures

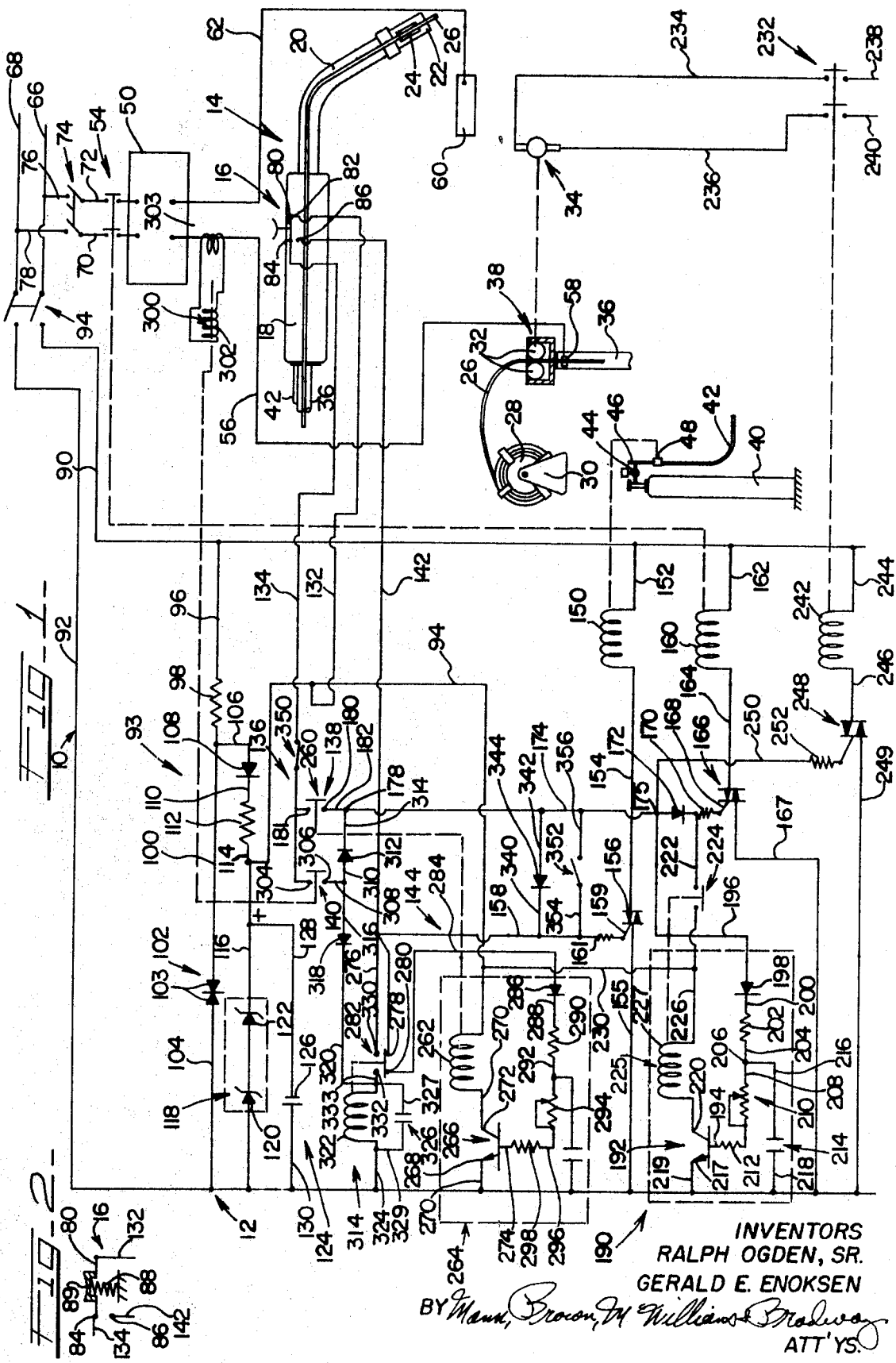

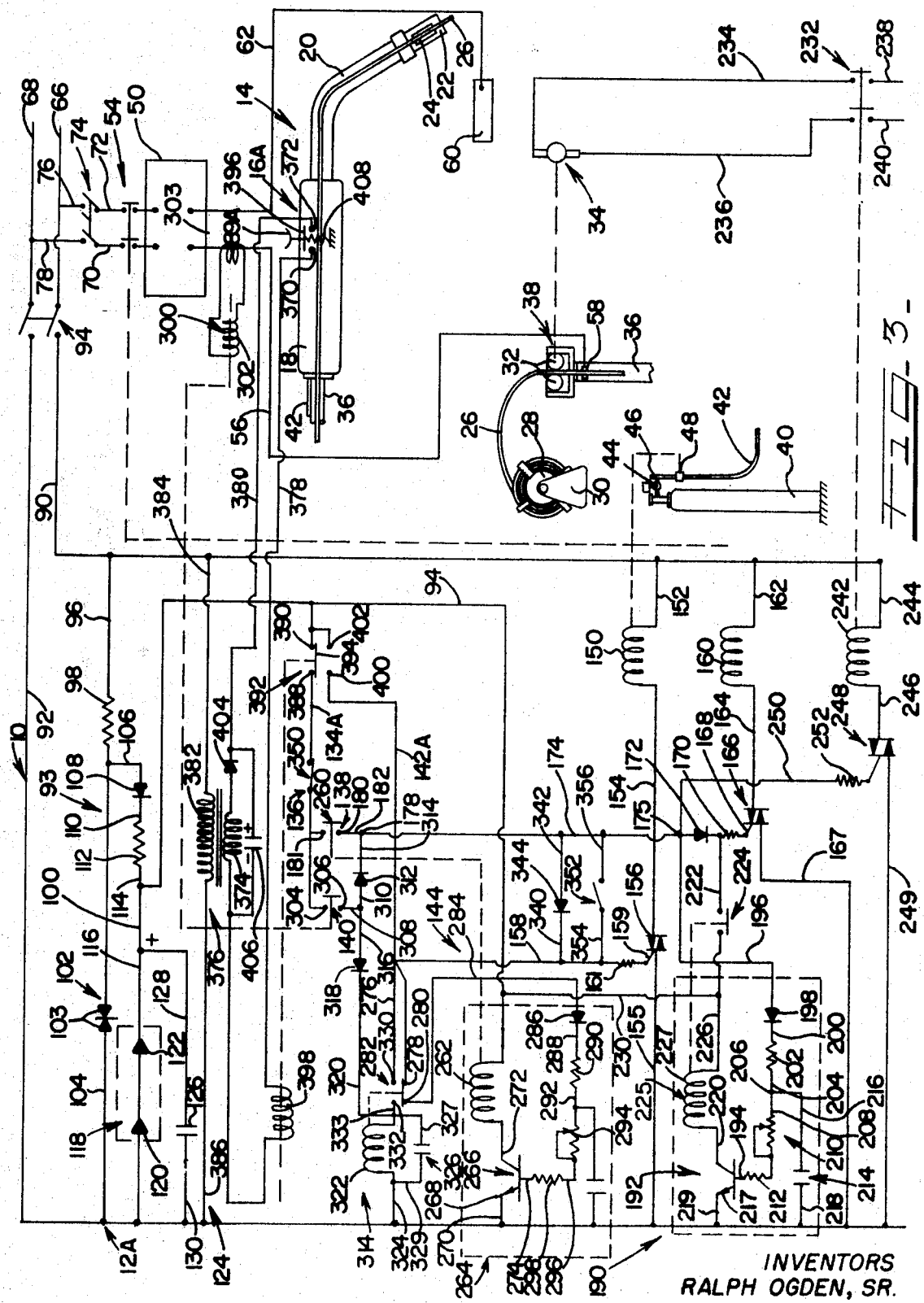

WELDING GUN TRIGGER CONTROL CIRCUIT

This invention relates to a trigger circuit or control for metallic electrode inert gas welding (known in the art as MIG welding), and more particularly, to an MIG welding control circuit that is fully controlled by the welding gun trigger to provide pre-welding gas purge, the necessary shielding gas flow, welding current and welding wire feed during welding, and post-welding gas purge.

Conventional MIG welding guns and the equipment they control are operated by the operator pressing the gun trigger switch, which results in simultaneous flow of shielding gas and supplying of welding wire and welding current. Welding continues so long as the operator maintains the trigger switch in a depressed position, and if he releases the trigger switch for any reason, all welding functions immediately stop. The result is that the need to continuously hold the trigger depressed is quite fatiguing, and frequently prevents the operator from using the torch to greatest advantage to avoid losing the necessary grip on the trigger switch.

One way this problem has been attempted to be solved is by using a latching relay in the trigger control circuitry. While this expedient has permitted the operator to weld without holding the trigger switch depressed, no protection is provided if the gun is dropped or the arc is otherwise broken, and under such circumstances the welding wire and gas continue to emit from the gun and the highly charged welding wire presents an obviously dangerous hazard.

Another approach to the problem has been to employ a latching trigger arrangement whereby the trigger is mechanically latched in its operating position. These arrangements have been found awkward and frequently unreliable in operation, and have the same disadvantages as latching relay arrangements if the gun is dropped or the arc is otherwise broken.

Furthermore, conventional MIG gun trigger controlled welding arrangements do not provide for post-weld purging of the weld. These procedures are sometimes necessary and rather expensive additions are required to conventional circuitry to make these functions available.

A principal object of this invention is to provide an MIG welding arrangement in which trigger switch holding during welding is eliminated, and the system automatically shuts itself off if the gun is dropped or the arc is otherwise broken.

Another principal object of the invention is to provide an MIG welding arrangement which has available both pre and post weld gas purge, and for a time period that is completely at the option of the operator.

Other objects of the invention are to provide a trigger circuit for MIG welding guns which eliminates the need for latching relays or triggers, which permits the operator to at all times have full control of his equipment, and which is economical of manufacture, convenient to install and use, and long lived in operation.

In accordance with this invention, the gas flow, welding current, and wire feed are separately controlled by solenoids which are connected in parallel across the trigger circuit line and each has in series with same a solid state switch in the form of a triac adapted to deenergize the solenoid it controls when non-conductive and energize the relay when conductive. The trigger circuit includes a welding subcircuit which includes a normally open solenoid controlled pre-welding switch and a normally open solenoid controlled welding switch, with the switches connected in parallel with the respective triacs, and a gas purge sub-circuit connected in series with the welding gas control triac. The trigger circuit provides a source of direct current which may be connected by employing the trigger switch to either subcircuit, with the trigger switch being biased to connect to the welding subcircuit. The pre-welding switch is closed in pressing the trigger to make the gas flow controlling triac conductive to provide pre-weld gas purge, a solid state timer also being actuated to energize the relay of which the pre-welding switch forms a part to close the pre-welding switch, said timer being arranged to hold the pre-welding switch closed an adjustable predetermined time after current flow to same is cut off when the trigger switch is released to start the welding operation. This release of the trigger switch connects the direct current supply with the welding sub-circuit to supply the current required to keep the gas flow controlling triac conductive, and to make conductive the triacs controlling welding current supply and welding wire feed. If the arc is struck, the welding switch of the welding sub-circuit, which is part of the current relay, is closed to complete an interlock circuit with the triacs, and welding proceeds, with the welding gas, welding current and wire feed being provided as required. If no arc is formed by the time the timer operates to open the pre-welding switch, the entire system shuts down.

The operator continues to weld without touching or holding the trigger switch in any manner until the welding operation is completed, and when welding is completed, the operator presses a trigger switch, which once again connects the direct current supply to the gas purge subcircuit to keep the gas flow controlling triac conductive, so that gas feed continues for post-weld purge as long as the operator holds the trigger depressed. The direct current supply to the triac controlling welding wire feed is cut off on post-purge, stopping wire feed. The control for the welding current supply includes a timer arrangement to maintain the welding current supply sufficiently long after post-purge is started to achieve stub burn off, after which the welding current control triac becomes non-conductive to shut off welding current supply.

After post-purge is completed, the operator releases the trigger switch, with the result that gas flow is shut off and the trigger circuit is automatically re-set for the next welding operation.

The trigger circuit also includes a manual switch arrangement so that control over the gas, welding current and welding wire feed functions can be initiated and maintained in the conventional trigger switch hold down manner where desired.

Still other objects, uses, and advantages will be obvious or become apparent from a consideration of the following detailed description and the application drawings in which:

FIG. 1 diagrammatically and schematically illustrates a MIG welding gun trigger circuit and related equipment associated therewith which are controlled by the operation of the gun trigger switch;

FIG. 2 diagrammatically illustrates the trigger switch on a larger scale; and

FIG. 3 is similar to FIG. 1 but illustrates a modified form of the invention.

However, it is to be distinctly understood that the specific drawing illustrations provided are supplied primarily to comply with the requirements of the Patent Code, and that the invention may have other embodiments that will be obvious to those skilled in the art.

Reference numeral 10 of FIG. 1 generally indicates one embodiment of the invention comprising a trigger circuit 12 operably associated with welding gun 14 that is equipped with the diagrammatically illustrated trigger switch 16 by which the trigger circuit 12 is operated to control the supply of shielding gas, welding current, and welding wire to the gun 14.

The welding gun 14 illustrated is intended to represent a typical welding gun used in the trade, except for trigger switch 16, and comprises a handle 18 and a gooseneck nozzle 20 equipped with a gas cup 22 and contact tip 24. As is conventional, the welding wire or electrode 26 is drawn from a suitable reel 28 rotatably mounted on bracket structure 30 by a welding wire feed mechanism of a suitable nature, shown as including a pair of feed rolls 32 driven by a suitable motor indicated in symbol form at 34. The feed rolls 32 serve to feed the welding wire 26 into and through cable 36 which is connected between the welding wire feed mechanism 38 and the gun handle 18, with the welding wire proceeding through the gun into contact with the contact tip 24 and thence to the arc when welding is being done. A gas cylinder 40 serves to supply the shielding gas to gas line 42 that leads between gas cylinder 40 and the cable 36, line 42 including a suitable reducing valve 44, flowmeter 46 and solenoid operated valve 48. In the form shown, the gas is conveyed by conduit 42 to the handle 18 of the welding gun 14 through which it flows through suitable passageways into the gas cup 22 for shielding the arc. Line 42 downstream of valve 48 and cable 36 conventionally are suitably flexible to permit the operator the necessary freedom of movement.

Welding current is supplied from suitable welding machine 50, as through lead 56 leading to a suitable contact 58 connected to the copper stranded portion (not shown) of conventional cable 36 through which the welding current is connected to welding gun 14 and tence to the contact tip 24 where it is picked up by the welding wire 26. Workpiece 60 is connected by suitable lead 62 back to the welding machine 50. Welding machine 50 is, for purposes of illustration, shown suitably connected to power lines 66 and 68 through suitable leads 70 and 72 leading to suitable switch 74 and suitable leads 76 and 78 that connect with the respective power lines. Leads 70 and 72 in the form shown are interrupted to include solenoid operated switch 54 that represents the conventional weld contactor.

Trigger switch 16 in the form shown comprises switch arm 80 that is pivoted at contact 82 to swing between contacts 84 and 86, switch arm 80 preferably being biased against the contact 84 by some suitable biasing arrangement such as spring 88 that is shown in FIG. 2. Trigger switch 16 is provided with a suitable thumb or finger engaging button 89.

As previously mentioned, in accordance with standard practice, the welding operator must hold the gun trigger switch depressed during welding, but in accordance with this invention, the trigger 16 is incorporated in a trigger circuit 12 which, when the trigger circuit 12 is operating, permits the operator to start the welding operation by depressing the switch 16 to get a pre-welding purge gas flow without welding wire feed or welding current being supplied, and on release of the trigger switch after pre-welding gas purge has been completed, if it is required, the trigger circuit 16, if the arc is established, continues the shielding gas flow and starts the welding wire feed and supply welding current. When welding is completed, the trigger 16 is again depressed to stop welding wire feed, and after stub burn off, the welding wire current, while the welding gas continues to flow for post-weld purge. After the post-weld purge has been completed, the trigger switch is released to shut off the supply of welding gas and reset the trigger circuit for the next welding operation.

Trigger circuit 12 in addition to trigger switch 16, in the form diagrammatically illustrated generally comprises lines 90 and 92 suitably connected to power lines 66 and 68, respectively, as through suitable switch 94 that may be manually operated and located on the welding machine or any other suitable and convenient place at the welding area.

Connected between lines 90 and 92 is a source 93 of direct current for direct current bus line 94, which source 93 in the form shown comprises connector 96 extending between line 90 and suitable resistor 98, connector 100 extending between resistor 98 and a suitable transient voltage suppressor arrangement generally indicated 102 which may be in the form of two selenium diodes 103 arranged back to back. Connector 104 extends between the voltage suppressor arrangement 102 and line 92.

Connector 106 extends between line 100 and suitable diode 108, with the diode 108 being connected to bus line 94 through connector 110, resistor 112, and connector 114. Line 116 extends between connector 114 and line 92 and has connected in series with same suitable line and load voltage regulating means indicated at 118, which in the form shown is illustrated as comprising two zener type diodes 120 and 122. Connected around the regulator 118 is a suitable direct current filter indicated at 124 in the form of a capacitor 126, with lead 128 extending between line 116 and the capacitor 126 and lead 130 extending between the capacitor 126 and line 92.

The direct current bus line 94 is connected to trigger switch arm 80 by connector 132 extending from the bus line to trigger contact 82. The contact 84 of the trigger switch 16 is connected by connector 134 into welding subcircuit 136 including a pre-welding switch 138 and a welding switch 140. The contact 86 of the trigger switch 16 is connected by connector 142 to a gas purge subcircuit 144.

The welding sub-circuit 136 and the gas purge subcircuit 144 are controlled by the operation of the trigger switch 16 to bring into operation the necessary gas flow, welding current supply and welding wire feed, and in the illustrated arrangement, gas flow is effected by opening solenoid valve 48, one end of the coil 150 of which is connected to line 90 by connector 152 and the other end of which is connected to triac 156 by connector 154, with the triac 156 being connected to line 92 by connector 155. The conductivity of triac 156 is controlled by connecting same to the source of DC current by connector 158 through connector 159 and resistor 161, which connector 158 is in turn connected to trigger switch contact 86 through connector 142.

Welding current is supplied to the welding gun 14 on closure of the switch 54 (assuming switch 74 is also closed), the controlling coil 160 of which is connected to line 90 by connector 162 and to triac 166 by connector 164, triac 166 being connected to line 92 by connector 167. The conductivity of triac 166 is controlled through trigger switch 16 by connector 168, resistor 170, diode 172, and connector 174 that extends to terminal 178 that is connected to contact 180 of pre-welding switch 138 by lead 182.

Operably associated with the triac 166 for stub burn off purposes is timer device 190 which comprises an NPN type transistor 192 having its base 194 connected to connector 174 at terminal 175 by connector 196, diode 198, connector 200, resistor 202, connector 204, terminal 206, connector 208, adjustable resistor 210, and resistor 212. The timer includes capacitor 214 connected around resistors 210 and 212 and the transistor 192 to line 92 by connectors 216 and 218, and the emitter 217 of transistor 192 is connected to line 92 by connector 219.

The collector side 220 of transistor 192 is connected to the triac 166 through a connector 222, switch 224 and connector 226, with the coil 227 of relay 225 being in series between line 226 and the transistor collector side 220. Jumper 230 connects connector 226 with bus line 94 for supplying direct current to coil 227 and triac 166 at the appropriate time, as will be made clear hereinafter. Adjustable resistor 210 permits timer 190 to be set to turn off transistor 192 a desired predetermined time after the trigger switch 16 is depressed to stop welding, for instance, in the range of from zero to about 1.0 second.

Welding wire feed is provided on actuation of motor 34 for driving wire feed device 38 on closure of solenoid operated switch 232 to connect motor lead lines 234 and 236 to power lines 238 and 240, respectively. The coil 242 of relay 232 is connected to line 90 by connector 244 and to triac 248 by connector 246, triac 248 being connected to line 92 by connector 249. The conductivity of triac 248 is controlled by direct current feed from connector 174 through connector 250 and suitable resistor 252.

The pre-welding switch 138 is part of a relay 260, the coil 262 of which forms a part of timer device 264 comprising NPN type transistor 266 having its emitter side 268 connected to line 92 as by connector 270 and having its collector side 272 connected to coil 262 by connector 272 with the other end of the coil being connected to the direct current bus line 94.

The base 274 of the transistor 266 is connected to contact 86 of trigger switch 16 through line 142, connector 276, contacts 278 and 280 (when closed) of solenoid operated double pole switch 282, connector 284, diode 286, connector 288, suitable resistor 290, connector 292, adjustable resistor 294, connector 296, and resistor 298. On energization of coil 262, switch 138 closes to connect contact 180 with the contact 181. Adjustable resistor 294 permits timer 264 to be set to turn off transistor 266 a desired predetermined time after the trigger switch 16 is initially depressed to provide pre-weld gas purge, for instance, in the range of from about 3 to about 4 seconds.

When switch 54 closes, welding current flows, starting the arc, and relay 300 closes, the coil 302 of which, for illustrative purposes, is shown in series with a coil 303 operably associated with lead 56 (it could be lead 62) to energize coil 303 when welding current flows. The welding switch 140 is part of the current relay 300 and closes contacts 304 and 306 to supply direct current to connector 308 and thence to connector 174 through connector 310, diode 312, and connector 314. Direct current is also supplied through switch 140 (when closed) to another timer device 314 through lead 316, diode 318, and lead 320.

Timer 314 comprises coil 322 of switch 282 connected between connector 320 and connector 324, the latter being connected to line 92. Capacitor 326 is connected across the ends of coil 322 by leads 327 and 329 and is arranged to maintain coil 322 energized to close contacts 330 and 332 of switch 282, contacts 330 and 332 being normally open and contacts 278 and 280 being normally closed. Contact 332 is connected to connector 320 by lead 333.

Connectors 340 and 342 extend between the respective connectors 158 and 174 and diode 344 to provide direct current feed to triac 156 when welding switch 140 is closed.

In the illustrated embodiment, the trigger circuit 12 can be set for manual operation by opening normally closed switch 350 in connector 134 and closing normally open switch 352, the contacts of which are connected to the respective connectors 158 and 174 by connectors 354 and 356. In practice, switches 350 and 352 may be combined into a conventional toggle switch for off-on operation purposes.

In operation, switches 74 and 94 are closed to connect the welding machine 50 and the trigger circuit to the source of power. Switch 350 is disposed in its normally closed position while switch 352 is in its normally open position. Trigger switch 16 has its contact arm 80 biased against its contact 84 and since both the pre-welding switch 138 and the welding switch 140 are open, no welding current is available to the gun 14, and welding wire feed and gas flow are dormant. A suitable voltage is impressed on direct current bus 94.

Assuming that the operator wishes to use the automatic features of trigger circuit 12 to perform a weld, the operator presses the trigger button 89 to depress switch arm 80 against contact 86, which connects the direct current bus line 94 to the gas purge subcircuit 144 through connector 142. Direct current flows from connector 142 through connector 158 of subcircuit 144 to triac 156 to make this device conductive, which results in coil 150 of valve 48 becoming energized and opening valve 48 to provide shielding gas flow to gun 14. Simultaneously, direct current from connector 142 proceeds through connector 276, normally closed contacts 278 and 280 of switch 282, and connector 284 to timer device 264 and thence to the base 274 of transistor 266 to actuate same whereby coil 262 of pre-welding switch 138 is energized to close switch 138.

So long as the operator maintains the trigger switch depressed to keep switch arm 80 against contact 86, this condition of the trigger circuit will be maintained, shielding gas emitting from the gun gas cup 22 for gas purge purposes.

To start welding, the operator merely releases the trigger switch 16, whereby the switch arm 80 is biased against contact 84 whereby direct current from the DC bus line 94 now is switched to the welding subcircuit through connector 134 and switch 350, then through pre-welding switch 138, connector 174 and the respective triacs 156, 172 and 248 through the circuiting indicated. Triac 156 is already conductive so no change takes place there, but now triacs 166 and 248 become conductive, which results in the closing of welding current switch 54 to make available welding current to the gun 14, and wire feed drive switch 232, which starts the movement of welding wire 26 through gun 14.

Timer 190 also becomes actuated by direct current supply through conductor 196 to the base of transistor 192 which closes switch 224 and sets up the stub burn off sequence of the trigger circuit.

If the arc is struck, welding current flows through the welding circuit that is indicated in the drawing, and current relay 300 closes, thereby closing welding switch 140, whereupon direct current from bus 94 is supplied to the triacs 156, 166 and 248 through connectors 308 and 310, diode 312, connector 314, connector 174, etc. Timer 264 will time out at its predetermined time, opening pre-welding switch 138.

Direct current also proceeds from the contact 306 of switch 140 through connector 316, diode 318, connector 320 to timer 314 to energize coil 322 and close switch contacts 332 and 330, and open switch contacts 278 and 280, thereby disconnecting direct current feed to the base of transistor 266 of timer 264.

Normal welding then can proceed with welding gas, welding current, and welding wire being supplied to the gun 14 in the usual manner.

If the arc is not struck, for any reason, by the time the timer 264 times out to open switch 138, since switch 140 will not close until the power relay is energized, the entire welding system goes dead. The starting sequence must be repeated if further welding is to be done.

When the welder has completed welding, he merely depresses the trigger switch 16 to switch the switch arm 80 to the contact 86, whereby the purging subcircuit is again connected to the direct current source to maintain the conductivity of triac 156 whereby the welding gas supply continues. However, the direct current supply to triac 248 has been cut off, which deenergizes coil 242 of switch 232 and opens switch 232 to stop operation of the wire feed mechanism 38.

As to the triac 166, the jumper 230 conducts direct current from direct current bus 94 to line 226, switch 224 (which is maintained closed for a predetermined stub burn off time by timer 190), line 222 and resistor 170, so that welding current remains available at the contact tip 24 for a short period to provide for the stub burn off, for instance between zero to about 1.0 second. Timer 190 then operates to open switch 224 whereby triac 166 becomes nonconductive and coil 160 of welding current switch 54 becomes de-energized to result in the opening of switch 54 and the shutting off of welding current from welding machine 50.

However, as long as the operator maintains the trigger switch depressed to keep the switch arm 80 in contact with contact 86, post welding gas purge continues, as triac 156 continues to be exposed to a direct current feed. Contacts 330 and 332 of switch 282 also remain closed. Capacitor 326 maintains coil 322 energized during the time that switch arm 80 is moving between the contacts 84 and 86, whereupon direct current is available from connector 142 across the closed contacts 330 and 332 of switch 282 to maintain coil 322 energized.

After post gas purge is completed, the operator merely releases the trigger switch, which results in switch arm 80 returning into engagement with contact 84, and disconnects the purge subcircuit 144 from the direct current source, whereby triac 156 becomes nonconductive to de-energize coil 150 of valve 48 and stop gas feed. Coil 322 of switch 282 also de-energizes to open contacts 330 and 332 and close contacts 278 and 280 to set the trigger circuit up for the next welding sequence.

While solenoid switches have been illustrated for purposes of description, in practice switches 138, 224 and 282 are reed relays, switches 138 and 224 being single pole, single throw, normally open switches while switch 282 being a single pole, double throw switch in which the contacts corresponding to contacts 278 and 280 are normally closed. In one commercial embodiment of the invention, 117 volts AC exists across lines 90 and 92, making 13.6 volts DC available in bus 94. However, these specifics as well as those of the specific diodes, capacitors, resistors, etc. employed are within the skill of the art to supply, depending on the circuit designers objectives. The triacs herein referred to are sometimes called bilateral triode switches.

In the form of FIG. 3, trigger circuit 12A has a two wire connection to the gun 14A, and is arranged to isolate the gun from line voltage. In this embodiment, trigger switch 16A comprises two contacts 370 and 372 respectively connected to the secondary coil 374 of transformer 376 by the respective leads 378 and 380. The primary coil 382 of transformer 376 is connected across lines 90 and 92 by leads 384 and 386. Connector 134A leading to welding subcircuit 136 contains contacts 338 and 390 of switch 392 which are normally closed by switch 394. When trigger switch 16A is actuated to move its switch arm 396 to close contacts 370 and 372, coil 398 of switch 392 is energized to open its contacts 388 and 390, and close its contacts 400 and 402 that are in connector 142A leading to the gas purge subcircuit 144.

In the form shown, switch 392 is preferably a reed relay, and diode 404 provides half wave direct current (preferably at 12 volts) to the trigger switch 16A, capacitor 406 being provided to act as a filter so as to avoid chattering of switch 392.

Trigger circuit 12A operates in the same manner as trigger circuit 12, thumb engaging button 89A being employed to operate trigger switch 16A, which in turn effects operation of switch 392 to provide the trigger circuit functions already described. Button 89A is spring biased to make contacts 370 and 372 of the trigger switch normally open, as by employing suitable compression spring 408.

It is pointed out that the specific electrical devices shown and referred to relative to trigger circuits 12 and 12A and the welding system of which they form a part are exemplary only, though many of those referred to are preferred because of their low cost, diminutive size and reliability in use.

It will therefore be seen that this invention provides a number of important functions in one economical trigger circuit.

For instance, pre-purging is provided for with the length of time of same completely at the operator's option. If no pre-purge is required, then immediate release of the trigger switch after initial depressing brings into operation the welding functions of the welding apparatus.

After the welding cycle begins, the controls governing the gas, power and wire feed supply are held operative by the current relay, and consequently the welder need only be concerned about holding the gun for welding. He thus can readily change grips, or change the gun from hand to hand without the weld being interrupted.

Post-purge is also available, and similar to pre-purge, post-purge time is completely at the operator's option. If no post-purge is required, the operator merely releases the trigger switch after depressing it to stop the welding operations.

During welding, welding can be stopped at any time by merely lifting the gun from the work to break the arc. Similarly, if the gun is accidentally dropped while welding, the welding functions of the apparatus cease immediately.

The time delay arrangement in association with the welding current supply triac 166 provides for stub burn back control. As is well known in the art, when the current to welding wire feeders is interrupted, the motor and reducing gears that are conventionally involved tend to coast somewhat, and if the weld gun is not withdrawn from the work, this can lead to welding wire entering the weld puddle and being trapped in same when it solidifies. In accordance with this invention, on shutting off the welding functions, there is a time delay in the discontinuance of the welding current to insure welding stub burn off. This time delay is adjustable by adjusting the adjustable resistor 210.

Another safety feature involved is that if the trigger of the welding gun is accidentally bumped, the pre-purge functioning of the trigger circuit may be initiated, but the circuit will automatically shut itself off if no arc is struck.

In addition to these important advantages, the trigger circuit of this invention can be converted to conventionally operating circuit, in which issuing gas, welding current, and welding wire feed are provided by maintaining the trigger depressed, by employing a simple single pull double throw switch to perform the function of switches 350 and 352. An example of when operation in this manner would be desirable would be when consecutive short tack welds are to be made.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In MIG welding apparatus including a welding gun, a welding wire source including a welding wire feed device and means for guiding the welding wire to the gun, a source of welding current and welding circuit means, in which the gun is incorporated, for supplying the gun with welding current, a source of shielding gas and conduit means connecting same to the gun for supplying shielding gas thereto, and a trigger switch and trigger control circuit controlled thereby for controlling the supply of welding wire, shielding gas and welding current to the gun, the improvement comprising:

a source of direct current;
a welding subcircuit connected in said trigger control circuit and including a normally open pre-welding switch and a normally open welding switch for initiating shielding gas, welding current, and welding wire feed upon activation;
a gas purge subcircuit connected in said trigger control circuit for initiating shielding gas supply upon activation;
said trigger switch including means for alternately connecting said source of direct current to said welding and gas purge subcircuits for activating said subcircuits and having a first position in which said direct current source is connected to said gas purge subcircuit and a second position in which said direct current source is connected to said welding subcircuit, said trigger switch being normally biased to said second position;
separate control means responsive to activation of the welding and gas purge subcircuits for respectively controlling the supply of shielding gas, welding current and welding wire to the gun, each control means including an electromagnetic-controlled actuating means having a switch means in series therewith to initiate shielding gas, welding current, and welding wire feed upon the activation of the respective actuating means, said switch means comprising means for rendering the same conductive when said pre-welding or welding switch are closed and said trigger switch is in the second position, wherein when the respective switch means are conductive, the actuating means are activated;
means for closing said pre-welding switch responsive to actuation of said trigger switch to said first position;
timer means for limiting the time said pre-welding switch remains closed after being closed by said closing means, said timer means including time delay means to open said pre-welding switch a pre-determined time after said trigger switch has been actuated to said first position and released to said second position;
and welding current actuated means responsive to welding current flow for closing said welding switch when said welding current switch means is conductive,
whereby on initial actuation of said trigger switch to said first position from said second position, said shielding gas switch means is made conductive whereby pre-welding purging gas is available to the gun from said gas source without welding wire or welding current feed, and on release of said trigger switch, said trigger switch returns to said second position and all said switch means are conductive to supply shielding gas, welding current and welding wire feed, whereupon, if the welding arc is struck, shielding gas, welding current and welding wire are supplied to the gun, and on completion of welding, actuation of said trigger switch to said first position from said second position retains conductivity of said shielding gas switch means to supply post welding purge gas without welding for so long as the wire or current feed trigger switch is held in the first position, and whereby if the arc is not struck within a predetermined time initiating welding current flow, said timer means opens said pre-welding switch to render all said switch means non-conductive and ceasing all shielding gas, welding current and welding wire supply.

2. The improvement set forth in claim 1 wherein:
said switch means each comprises a bilateral triode switch.

3. The improvement set forth in claim 1 including:
means for maintaining the said switch means for the welding current control means conductive a predetermined time after the said switch means for the welding wire supply control means has become nonconductive to achieve stub burn off.

4. The improvement set forth in claim 1 wherein:
said trigger switch is on the welding gun and is connected to said direct current source and said subcircuits by a three wire circuit.

5. The improvement set forth in claim 1 wherein:
said trigger switch is on the gun and including means for isolating same line voltage.

* * * * *

UNITED STATES PATENT OFFICE
CERTIFICATE OF CORRECTION

Patent No. 3,662,147          Dated May 9, 1972

Inventor(s) Ralph Ogden, Sr. and Gerald E. Enoksen

It is certified that error appears in the above-identified patent and that said Letters Patent are hereby corrected as shown below:

Column 10, line 12, -- from -- should be inserted between "same" and "line".

Signed and sealed this 29th day of August 1972.

(SEAL)
Attest:

EDWARD M. FLETCHER, JR.
Attesting Officer

ROBERT GOTTSCHALK
Commissioner of Patents